(12) United States Patent
Alameh et al.

(10) Patent No.: US 11,146,671 B2
(45) Date of Patent: Oct. 12, 2021

(54) ADAPTIVE VIDEO INTERFACE SWITCHING

(71) Applicant: Motorola Mobility LLC, Chicago, IL (US)

(72) Inventors: Rachid Alameh, Crystal Lake, IL (US); John Gorsica, Round Lake, IL (US); Zhengping Ji, Hinsdale, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/569,662

(22) Filed: Sep. 12, 2019

(65) Prior Publication Data

US 2021/0218836 A1 Jul. 15, 2021

(51) Int. Cl.
| | |
|---|---|
| *H04M 1/72409* | (2021.01) |
| *H04W 4/80* | (2018.01) |
| *H04M 1/72412* | (2021.01) |
| *H04M 1/02* | (2006.01) |
| *H04M 3/56* | (2006.01) |

(52) U.S. Cl.
CPC ..... *H04M 1/72412* (2021.01); *H04M 1/0258* (2013.01); *H04M 1/0264* (2013.01); *H04M 3/567* (2013.01); *H04W 4/80* (2018.02)

(58) Field of Classification Search
CPC ........... H04M 1/72412; H04M 1/0264; H04M 3/567; H04M 1/72409; H04W 4/80
See application file for complete search history.

(56) References Cited

U.S. PATENT DOCUMENTS

| | | | |
|---|---|---|---|
| 2017/0064071 A1* | 3/2017 | Won | .................. G06F 1/1694 |
| 2017/0149956 A1 | 5/2017 | Thorn | |
| 2018/0288214 A1 | 10/2018 | Lv et al. | |
| 2019/0205011 A1* | 7/2019 | Li | ....................... G06F 3/147 |
| 2020/0213811 A1 | 7/2020 | Scott et al. | |

OTHER PUBLICATIONS

Cai, Wayne , "NonFinal Office Action", U.S. Appl. No. 16/569,665, filed Sep. 12, 2019; dated Nov. 17, 2020.
Cai, Wayne H. , "Final Office Action", U.S. Appl. No. 16/569,665, filed Sep. 12, 2019; dated Apr. 22, 2021.
Liao, Hsinchun , "Non-Final Office Action", U.S. Appl. No. 16/569,659, filed Sep. 12, 2019; dated Jul. 6, 2021.

* cited by examiner

*Primary Examiner* — Andrew Wendell

(57) ABSTRACT

A system and method of adaptive video interface switching between a mobile electronic communications device and a wearable device entail determining during an ongoing video session via a first one of the devices that an audio or video input or output mechanism on the first device is compromised. It is determined that the audio and video input and output mechanisms on a second of the devices are uncompromised. The video session is then continued using at least one of the audio and video input and output mechanisms on the second device.

20 Claims, 7 Drawing Sheets

ADAPTIVE VIDEO INTERFACE SWITCHING

TECHNICAL FIELD

The present disclosure is related generally to mobile electronic communications devices and, more particularly, to systems and methods for adaptively selecting a user interface associated with a mobile electronic communications device.

BACKGROUND

The cellular phone was initially created to be a phone, i.e., to allow voice communications. Moreover, despite the many new realms into which smart phones have moved, many users still use their cellular phones for voice interaction with others. To this end, most cellular phones include a built-in microphone ("mic") as well as a number of speakers.

These speakers generally include a loudspeaker configured to project sound that is audible to a user when the user's ear is not adjacent the loudspeaker as well as an earpiece speaker configured to project sound that is audible only when the user's ear is adjacent the earpiece speaker. This system generally works well, but in certain environments, sound quality at the mic or at one or both speakers may be compromised.

Before proceeding to the remainder of this disclosure, it should be appreciated that the disclosure may address some or all of the shortcomings listed or implicit in this Background section. However, any such benefit is not a limitation on the scope of the disclosed principles, or of the attached claims, except to the extent expressly noted in the claims.

Additionally, the discussion of technology in this Background section is reflective of the inventors' own observations, considerations, and thoughts, and is in no way intended to be, to accurately catalog, or to comprehensively summarize any prior art reference or practice. As such, the inventors expressly disclaim this section as admitted or assumed prior art. Moreover, the identification or implication herein of one or more desirable courses of action reflects the inventors' own observations and ideas, and should not be assumed to indicate an art-recognized desirability.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Before presenting a detailed discussion of embodiments of the disclosed principles, an overview of certain embodiments is given to aid the reader in understanding the later discussion. As noted above, most mobile electronic devices such as cellular phones include a loudspeaker for use when the user's ear is not adjacent the loudspeaker as well as an earpiece speaker for use when the user's ear is adjacent the earpiece speaker.

While this system works well in most cases, certain environments can reduce the ability of the device's mic and speakers to provide quality voice communications. For example, a phone may be placed in a pocket, rendering its mic and speakers covered or subject to interference such as rubbing, or in an otherwise inconvenient location for the user. Wind interference can produce a similar drop in quality. Even distance from the user may cause issues, since the mic and speakers on such a device do not have unlimited range.

In an embodiment of the disclosed principles, a mobile communications device such as a cellular phone adaptively configures the mic and speaker paths based on device and user context. In particular, in various embodiments of the described principles, the device adaptively selects between device-borne equipment (e.g., the cellular phone mic and speakers) and equipment (mic and speaker(s)) associated with a tablet, a computer, or a wearable device such as a watch, arm band or other wearable communication device.

Thus, for example, when a device is detected as stowed via internal sensors, as may happen when a phone is placed in the user's pocket, the input and output devices in the phone may be redirected to a wireless port in the phone input/output interface with similar components for communication with the tablet, computer, or wearable. The type of component engagement may be driven by the nature of the current phone operation. Thus, if the ongoing operation is a phone call, then the mic and speaker functions may be redirected in this way. If instead, the current operation is a video conference, then the phone mic and imager functions may be redirected. In the case of AI context sensing, the context sensing may be switched from the phone to the tablet, computer, or wearable. In a further or alternative embodiment, the selection of which device use for audio, video and other functions is also based on hardware considerations, such as battery level, DSP (Digital Signal Processing) capabilities and so on.

With this overview in mind, and turning now to a more detailed discussion in conjunction with the attached figures, the techniques of the present disclosure are illustrated as being implemented in or via a suitable device environment. The following device description is based on embodiments and examples within which or via which the disclosed principles may be implemented, and should not be taken as limiting the claims with regard to alternative embodiments that are not explicitly described herein.

Figure 1:
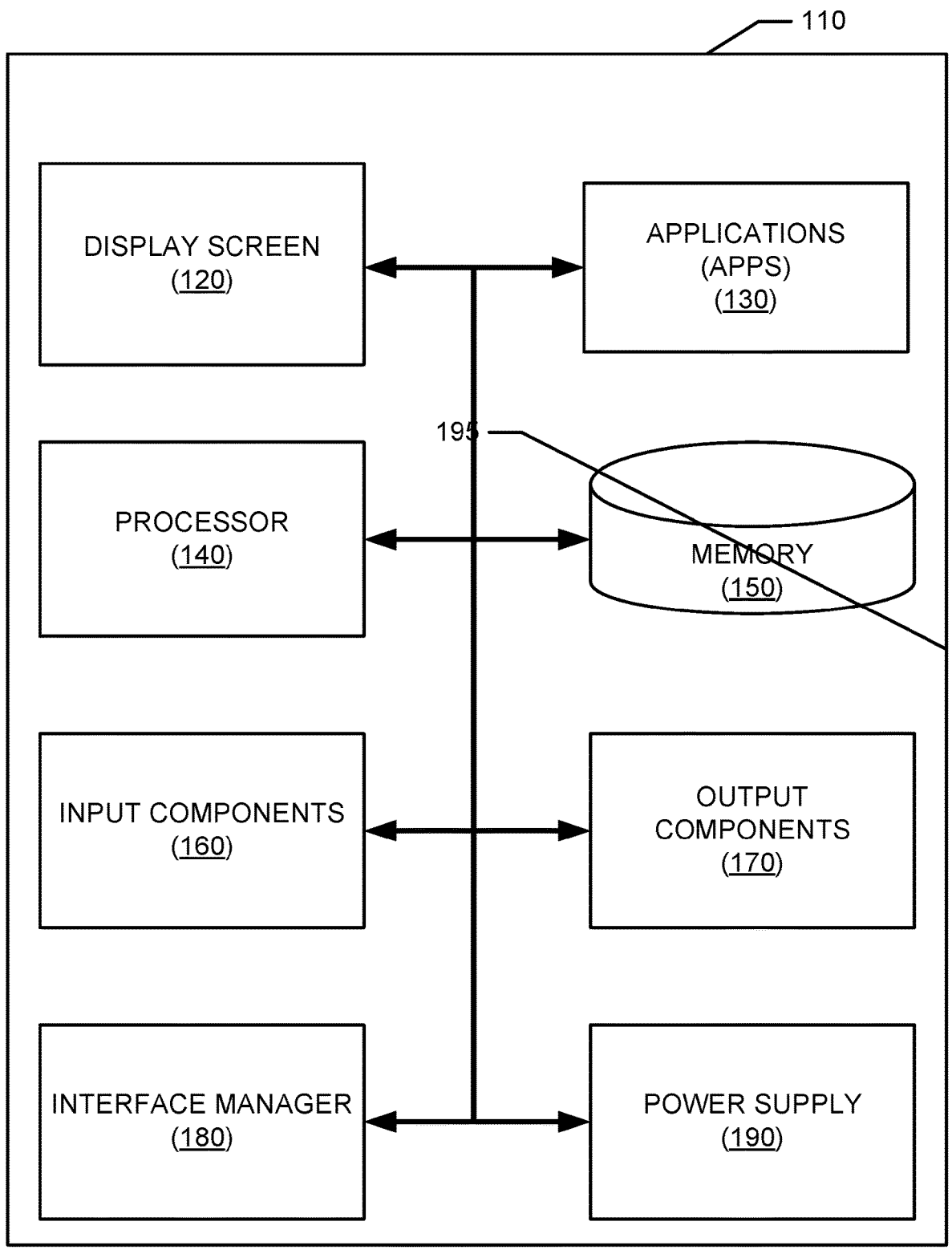
FIG. 1 is a general schematic representation of a mobile electronic device in which various embodiments of the disclosed principles may be implemented.

Thus, for example, while FIG. 1 is a simplified electrical schematic drawing illustrating components of an example mobile electronic communications device with respect to which embodiments of the disclosed principles may be implemented, it will be appreciated that other device types may be used, including but not limited to laptop computers, tablet computers, and so on. It will be appreciated that additional or alternative components may be used in a given implementation depending upon user preference, component availability, price point and other considerations.

In the illustrated embodiment, the components of the user device 110 include a display screen 120, applications (e.g., programs) 130, a processor 140, a memory 150, one or more input components 160 such as RF input facilities or wired input facilities, including, for example one or more antennas and associated circuitry and logic. The antennas and associated circuitry may support any number of protocols, e.g., WiFi, Bluetooth, different generations of cellular service, e.g., 4G, 5G, etc.

The device 110 as illustrated also includes one or more output components 170 such as RF (radio frequency) or wired output facilities. The RF output facilities may similarly support any number of protocols, e.g., WiFi, Bluetooth, cellular including 5G, etc., and may be the same as or overlapping with the associated input facilities. It will be appreciated that a single physical input may serve for both transmission and receipt.

The processor 140 can be a microprocessor, microcomputer, application-specific integrated circuit, or other suitable integrated circuit. For example, the processor 140 can be implemented via one or more microprocessors or controllers from any desired family or manufacturer. Similarly, the memory 150 is a nontransitory media that may (but need not) reside on the same integrated circuit as the processor 140. Additionally or alternatively, the memory 150 may be accessed via a network, e.g., via cloud-based storage. The memory 150 may include a random access memory (i.e., Synchronous Dynamic Random Access Memory (SDRAM), Dynamic Random Access Memory (DRAM), RAMBUS Dynamic Random Access Memory (RDRM) or any other type of random access memory device or system). Additionally or alternatively, the memory 150 may include a read-only memory (i.e., a hard drive, flash memory or any other desired type of memory device).

The information that is stored by the memory 150 can include program code (e.g., applications 130) associated with one or more operating systems or applications as well as informational data, e.g., program parameters, process data, etc. The operating system and applications are typically implemented via executable instructions stored in a non-transitory computer readable medium (e.g., memory 150) to control basic functions of the electronic device 110. Such functions may include, for example, interaction among various internal components and storage and retrieval of applications and data to and from the memory 150.

Further with respect to the applications and modules, these typically utilize the operating system to provide more specific functionality, such as file system service and handling of protected and unprotected data stored in the memory 150. In an embodiment, modules are software agents that include or interact with hardware components such as one or more sensors, and that manage the device 110's operations and interactions with respect to the described embodiments.

With respect to informational data, e.g., program parameters and process data, this non-executable information can be referenced, manipulated, or written by the operating system or an application. Such informational data can include, for example, data that are preprogrammed into the device during manufacture, data that are created by the device or added by the user, or any of a variety of types of information that are uploaded to, downloaded from, or otherwise accessed at servers or other devices with which the device is in communication during its ongoing operation.

In an embodiment, an interface manager 180 executes functions associated with the behaviors described herein with respect to interface selection and rerouting. In an embodiment, a power supply 190, such as a battery or fuel cell, is included for providing power to the device 110 and its components. Additionally or alternatively, the device 110 may be externally powered, e.g., by a vehicle battery, wall socket or other power source. In the illustrated example, all or some of the internal components communicate with one another by way of one or more shared or dedicated internal communication links 195, such as an internal bus.

In an embodiment, the device 110 is programmed such that the processor 140 and memory 150 interact with the other components of the device 110 to perform a variety of functions. The processor 140 may include or implement various modules and execute programs for initiating different activities such as launching an application, transferring data and toggling through various graphical user interface objects (e.g., toggling through various display icons that are linked to executable applications). As noted above, the device 110 may include one or more display screens 120. These may include one or both of an integrated display and an external display.

In an embodiment, the input 160 and output 170 components include one or more speakers, e.g., one or more earpiece speakers and one or more loudspeakers, as well as one or more microphones. It will be appreciated that these components may be built into the device 110, or alternatively, some or all may be separate from the device 110.

Figure 2:
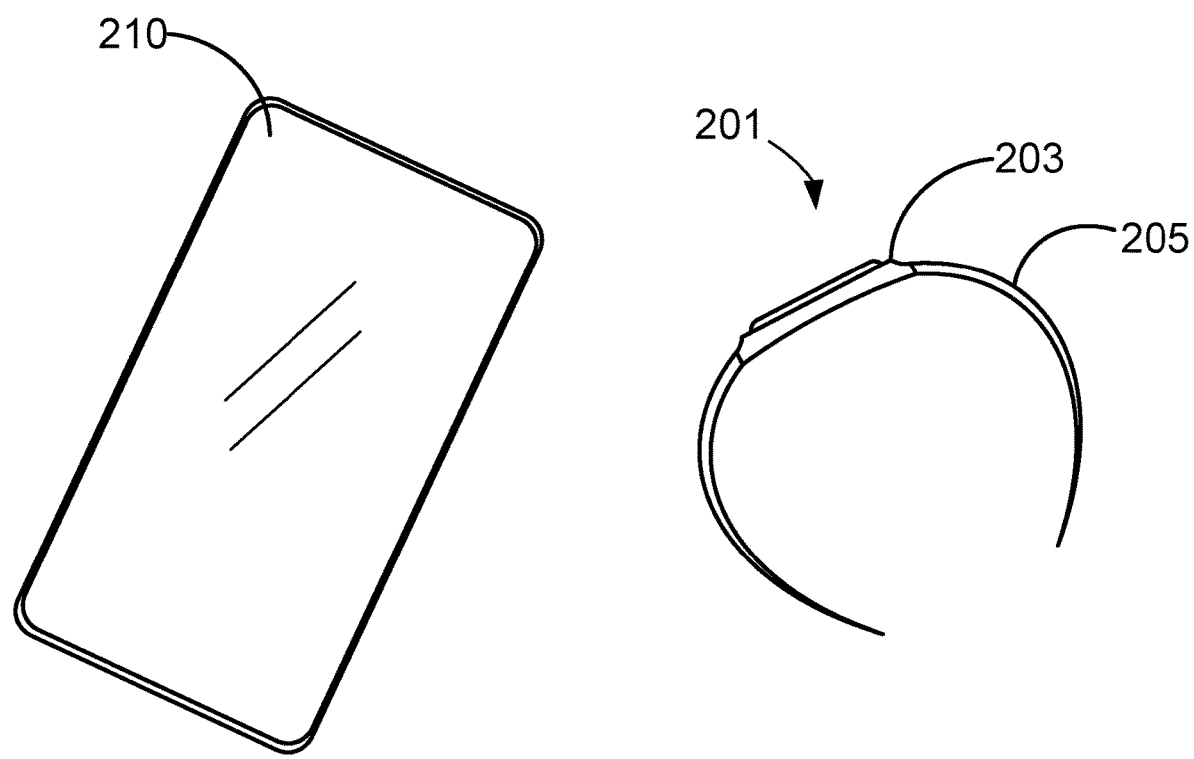
FIG. 2 is a simplified plan view of a device context including a cellular phone such as the device of FIG. 1, as well as a wearable device, within which embodiments of the disclosed principles may be implemented.

Turning to FIG. 2, this figure is a simplified plan view of a cellular phone 210 such as the device 110 of FIG. 1, as well as a wearable device 201. The wearable device 201 is illustrated as a watch having a main body 203 and a band 205, with the band 205 being configured to attach the wearable device 201 to a user's wrist. Although further process will be described with reference to the architecture shown in FIG. 2, it should be appreciated by those of skill in the art that any number of other device form factors may be used instead, including any type of wearable device such as a badge, watch, implant and so on.

The wearable device may be similar to the device 110 of FIG. 1 with respect to the configuration and functions of internal components. Thus, for example, the wearable device 201 may include a processor and display, as well as input and output components for user interaction (e.g., mic and speaker(s)) as well as radio frequency (RF) or other wireless interfaces for interaction with other devices such as the device 110 of FIG. 1. The same is applicable to non-wearable devices such as tablets, laptops, and so on.

As noted above, the device 210 (110 of FIG. 1) may use its own facilities or those of the wearable 201 depending upon the device capabilities, the nature of the ongoing operation and the current context, including chafing or rubbing, wind noise, distance, and so on. Turning to an example of operation to improve voice communications, consider the case where a cellular phone placed in the user's purse, bag or pocket during a call. In this case, in broad terms, the cellular phone's audio downlink and uplink may be adaptively and automatically routed to a BLUETOOTH port allowing the wearable mic and speaker to instead fulfill the sound gathering and sound projecting tasks required during the phone call.

The cellular link of the phone 210 may still carry the voice call, but the device 210 will interface audibly with the user via the facilities of the wearable device 201. The "covered context" is determined in this situation via the onboard sensors of the phone 210, e.g., the phone's mic, capacitive sensors, inductive sensors, inertial sensors and so on.

Consider the case where a user, during a voice call, picks up another device such as a tablet from a desk instead of the phone. This device may have better audio capabilities than the wearable device 201 determined via internal sensing, audio assessment (rubbing, noise, levels, acoustic background, etc.) contextual sensing, and proximity from user. In this case, a proximity sensor may trigger pairing of the phone 201 to the new device instead of the wearable device 201. When the covered status of the phone 210 ends (e.g., the user has removed the device 210 from his or her pocket) or the call is terminated, the phone 210 may so inform the wearable device 201, which may in turn release audio engagement, reverting the call, if still ongoing, back to phone audio.

In an embodiment, the wearable device 201 and mobile device 210 also dynamically select which device is the best for audio capture given current environment and context; that is, based on actual audio quality received by each microphone, rather than pocket detection. In this way, when the phone 210 mic is covered by a pocket, but the wearable device 201 is open for better audio streaming, the wearable device 201 may be selected to use for audio capturing.

Similarly, when the wearable device 201 is covered by the user's sleeve, but the phone 210 is open, the phone 210 may be selected to use for audio capturing. In particular, the system analyzes the audio streams captured by both devices to determine which stream should be used for further processing. The decision may be based on the signal waveform quality, the detected noise level, or more advanced acoustic interpretation.

Figure 3:
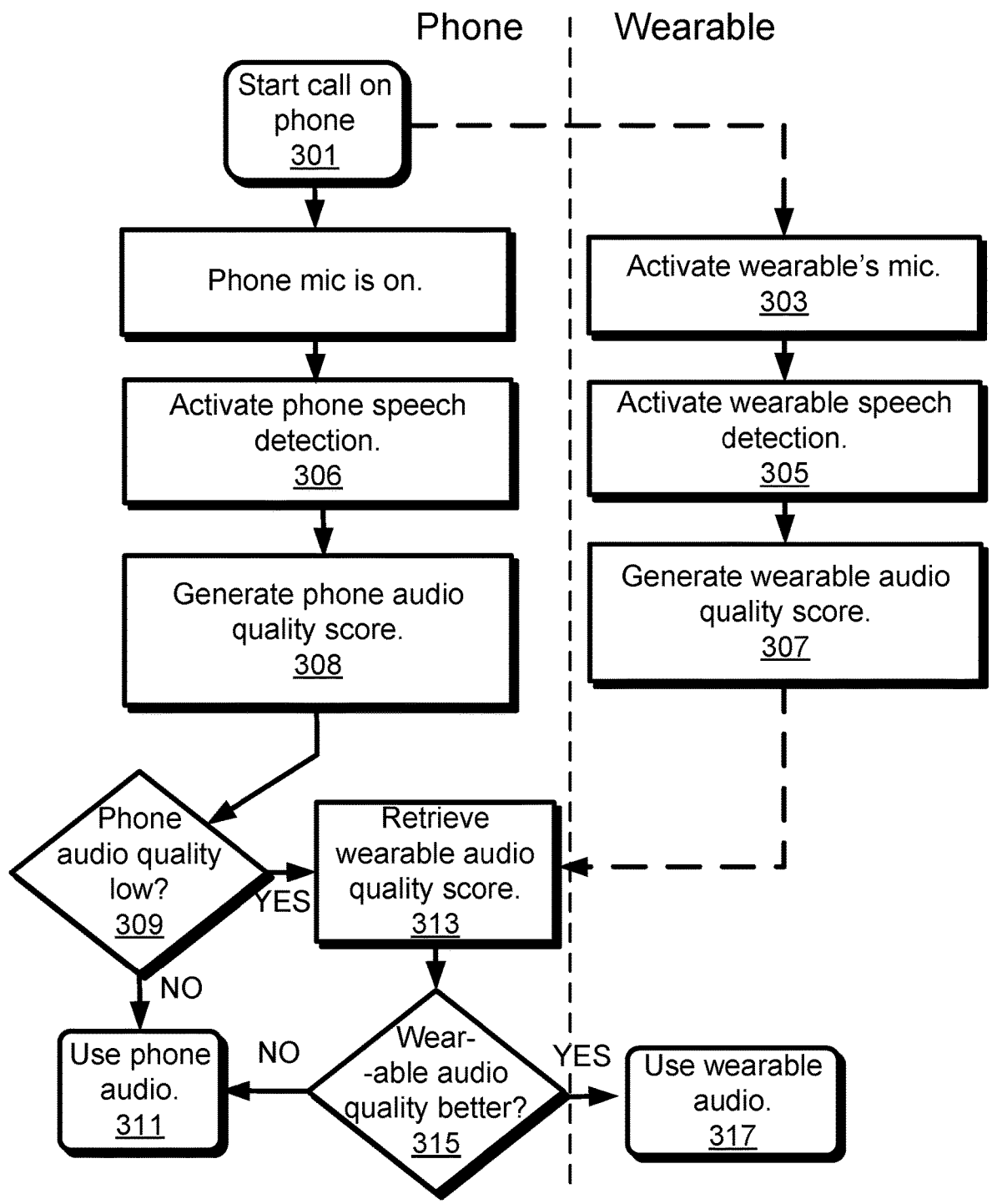
FIG. 3 is a flowchart showing a process of division of tasks between a phone and a wearable device in accordance with an embodiment of the disclosed principles.

Turning to FIG. 3, this figure shows a process of adaptive audio path selection in accordance with an embodiment of the disclosed principles, detailing steps taken with respect to the phone 210 and the wearable device 201. At stage 301 of the illustrated process, a phone call is commenced on the phone 210, e.g., by the user making or receiving a call. The phone's mic is active at this point, and at stage 303, the phone causes the wearable device's mic to activate as well.

At stage 305, speech detection on the wearable device 201 is activated, and similarly at stage 306, the phone 210 activates its speech detection. A quality score for the speech detected at the wearable device 201 is generated at stage 307 and a similar score for the phone 210 is generated at stage 308. In practice, one of these will be of a higher quality than the other, but both may be adequate or only one may be adequate. Thus the phone first checks at stage 309 whether the phone audio quality is too low, e.g., below a predetermined quality threshold to support voice communications.

If it is determined at stage 309 that the phone audio quality is adequate, e.g., not too low, the process moves to stage 311 wherein the phone 210 uses its own audio facilities (mic and speaker(s)) for the call. Otherwise, the process moves to stage 313 and the phone 210 retrieves the audio quality score for the wearable devoice 201. Subsequently at stage 315, the phone 210 determines whether the wearable device audio quality is better than the phone audio quality, and if so, the phone 210 switches the mic and speaker(s) for the call to the wearable device 201 at stage 317. Otherwise, the phone continues to use its own mic and speaker(s) for the call.

Figure 4:
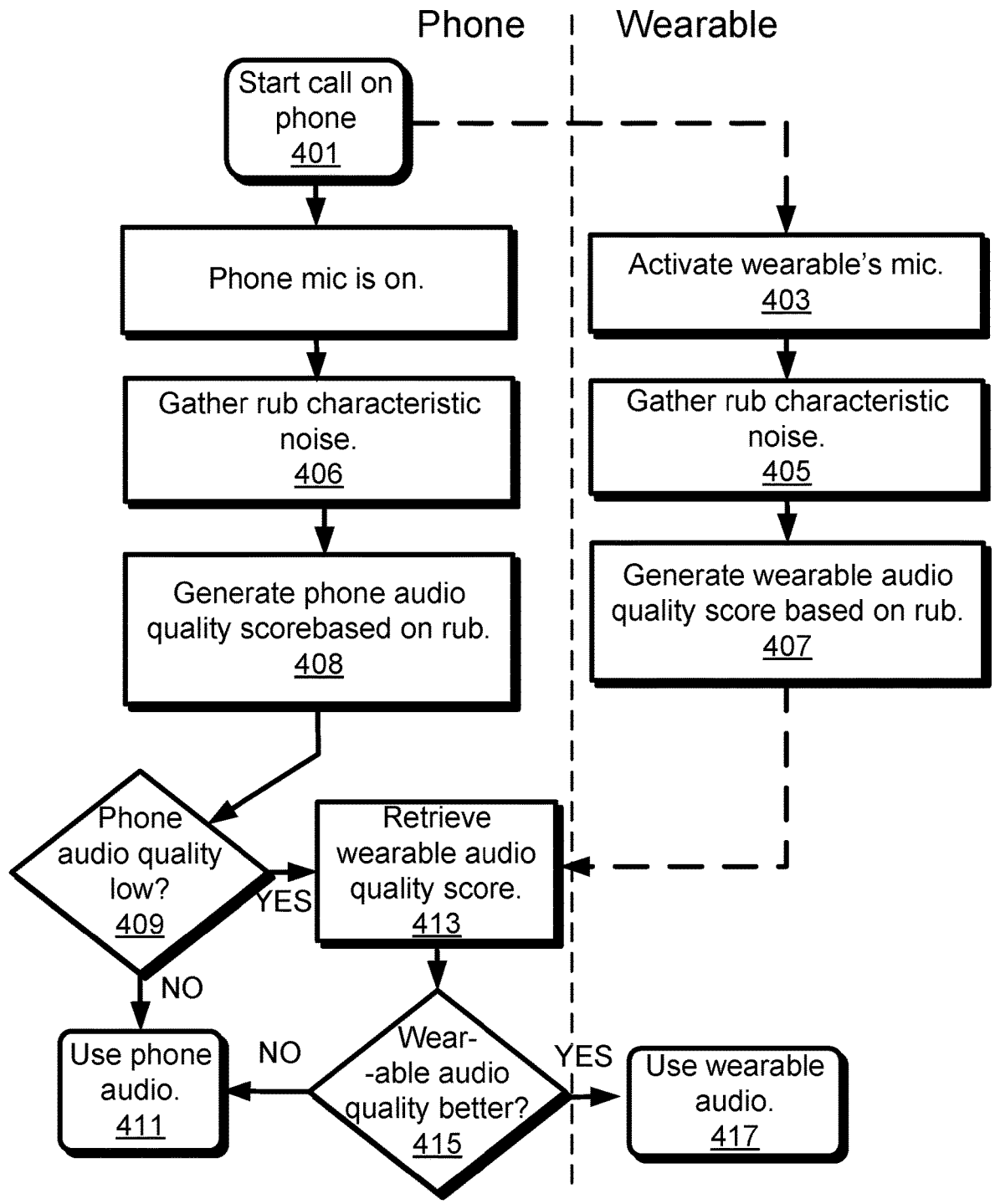
FIG. 4 is a flowchart showing a process of division of tasks between a phone and a wearable device in accordance with a further embodiment of the disclosed principles.

In a further embodiment, as noted above, the phone 210 utilizes rubbing detection rather than speech detection to make the determination as to which audio component to use for the call. FIG. 4 illustrates an example of such a process.

At stage 401 of the illustrated process, a phone call is commenced on the phone 210, e.g., by the user making or receiving a call. The phone's mic is on at this point, and at stage 403, the phone causes the wearable device's mic to activate as well.

At stage 405, rub noise on the wearable device 201 is gathered, and similarly at stage 406, the phone 210 gathers rub noise on its mic. A quality score for the audio at the wearable device 201 is generated based on the collected rub data at stage 407 and a similar score for the phone 210 is generated at stage 408 with respect to rub data collected via the phone's mic. The phone 210 then checks at stage 409 whether the phone audio quality is too low, e.g., below a predetermined quality threshold to support voice communications.

If it is determined at stage 409 that the phone audio quality is adequate, the process moves to stage 411, where the phone 210 uses its own audio facilities (mic and speaker(s)) for the call. Otherwise, the process moves to stage 413 and the phone 210 retrieves the audio quality score for the wearable devoice 201. Subsequently at stage 415, the phone 210 determines whether the wearable device audio quality is better than the phone audio quality, and if so, the phone 210 switches the mic and speaker(s) for the call to the wearable device 201 at stage 417. Otherwise, the phone continues to use its own mic and speaker(s) for the call.

Figure 5:
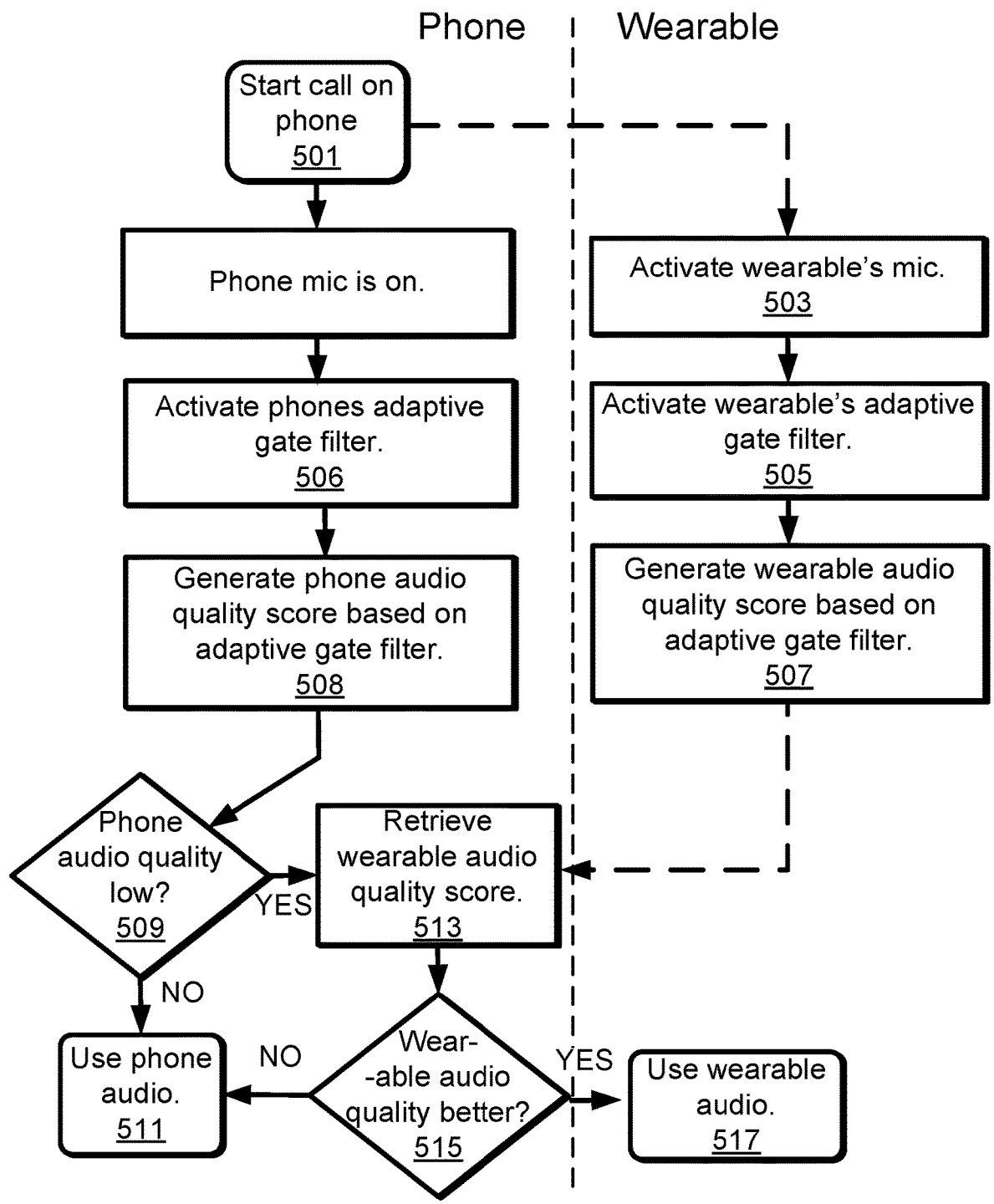
FIG. 5 is a flowchart showing a process of division of tasks between a phone and a wearable device in accordance with another embodiment of the disclosed principles.

In an embodiment of the disclosed principles, the phone 210 uses an adaptive filter to determine environmental acoustic noise at each of the phone 210 and the wearable device 201, and uses this determination to select an audio path for a call. FIG. 5 illustrates an example process in accordance with this embodiment. At stage 501 of the illustrated process, a phone call is commenced on the phone 210, e.g., by the user making or receiving a call. The phone's mic is on at this point, and at stage 503, the phone causes the wearable device's mic to activate as well.

At stage 505, an adaptive gate filter is activated on the wearable device 201. The adaptive gate filter may be set by the user, e.g., via a menu, and attempts to detect and quantify characteristics that may affect speech clarity, such as wind noise, ambient traffic or construction noise, and so on. Similarly at stage 506, an adaptive gate filter is activated on the phone 210. The adaptive gate filters may be, but need not be, the same on the phone 210 and the wearable device 201.

A quality score for the audio at the wearable device 201 is generated based on the filtered audio data at stage 507 and a similar score for the phone 210 is generated at stage 508 with respect to filtered audio data collected via the phone's mic. The phone 210 then checks at stage 509 whether the phone audio quality is too low, e.g., below a predetermined quality threshold to support voice communications.

If it is determined at stage 509 that the phone audio quality is adequate, the process moves to stage 511, where the phone 210 uses its own audio facilities (mic and speaker(s)) for the call. Otherwise, the process moves to stage 513 and the phone 210 retrieves the audio quality score for the wearable devoice 201. Subsequently at stage 515, the phone 210 determines whether the wearable device audio quality is better than the phone audio quality, and if so, the phone 210 switches the mic and speaker(s) for the call to the wearable device 201 at stage 517. Otherwise, the phone continues to use its own mic and speaker(s) for the call.

Similar function occur, in an embodiment, with respect to AI (artificial intelligence) context data gathering. For example, when the phone 210 is covered or otherwise substantially blocked or hindered during context gathering, it may cause the wearable device 201 to activate its sensors to capture AI context and pass the gathered context data to the phone. In a further embodiment, when the wearable device 201 is not engaged in a call, it can record background audio and compress the recorded audio to support always-on machine learning training in the phone 210.

With respect to video communications, the same problems of covering and blocking can occur. Thus, for example, if a user is engaged in a video conference call and the phone suddenly became blocked, the mic and camera path in the phone 210 are automatically switched to the wearable device 201 mic and camera to provide that input to the phone. The mic and camera of the phone 210 may also be disabled at that point to conserve power.

In a further embodiment, the operative user interface (UI) may be switched between the phone 210 and the wearable device 201 as needed. In this embodiment, the wearable device 201 maintains one or more UI profiles representative of the phone 210. These are used to control certain aspects of the phone 210 when it is covered. Some examples are audio UI to adjust or mute phone volume, phone setting UI and call handling UI. These interfaces become active when the phone 210 is blocked to simplify and optimize the UI interface from the secondary device (wearable, tablet, computer) in support of the phone 210.

Thus, for example, if a user were engaging with the phone 210 (gallery viewing, phone call, texting, surfing) and the phone 210 becomes blocked, the wearable device 201 may switch its UI to its phone control UI to continue the task occurring via the phone 210 prior to blockage (the phone control UI allows the wearable 201 to better control the phone 210). The UI functions are configured to reflect the mode/operation of the phone at the time of blockage so as to allow a continuation of the phone session on the wearable device 201.

In an alternate embodiment, if a covered phone 210 can still output or receive good audio and is thus able to sense the environment, it may continue in use with respect to whatever ongoing function it can still support. To that end, when a phone 210 detects that it is covered (e.g., via its sensors or audio assessment), its input and output communication and sensing is assessed by wearable device 201 and by covered phone 210 itself.

Thus, for example, a wearable device 201 may receive the audio of the covered phone 210 and determine if it is still good enough to use. In this case no audio switching is necessary. Phone sensors in the covered phone 210 are also scanned to determine if they still can be used for AI contextual detection within the phone 210. An example of potential process flows in such situations is shown in FIGS. 6 and 7.

Figure 6:
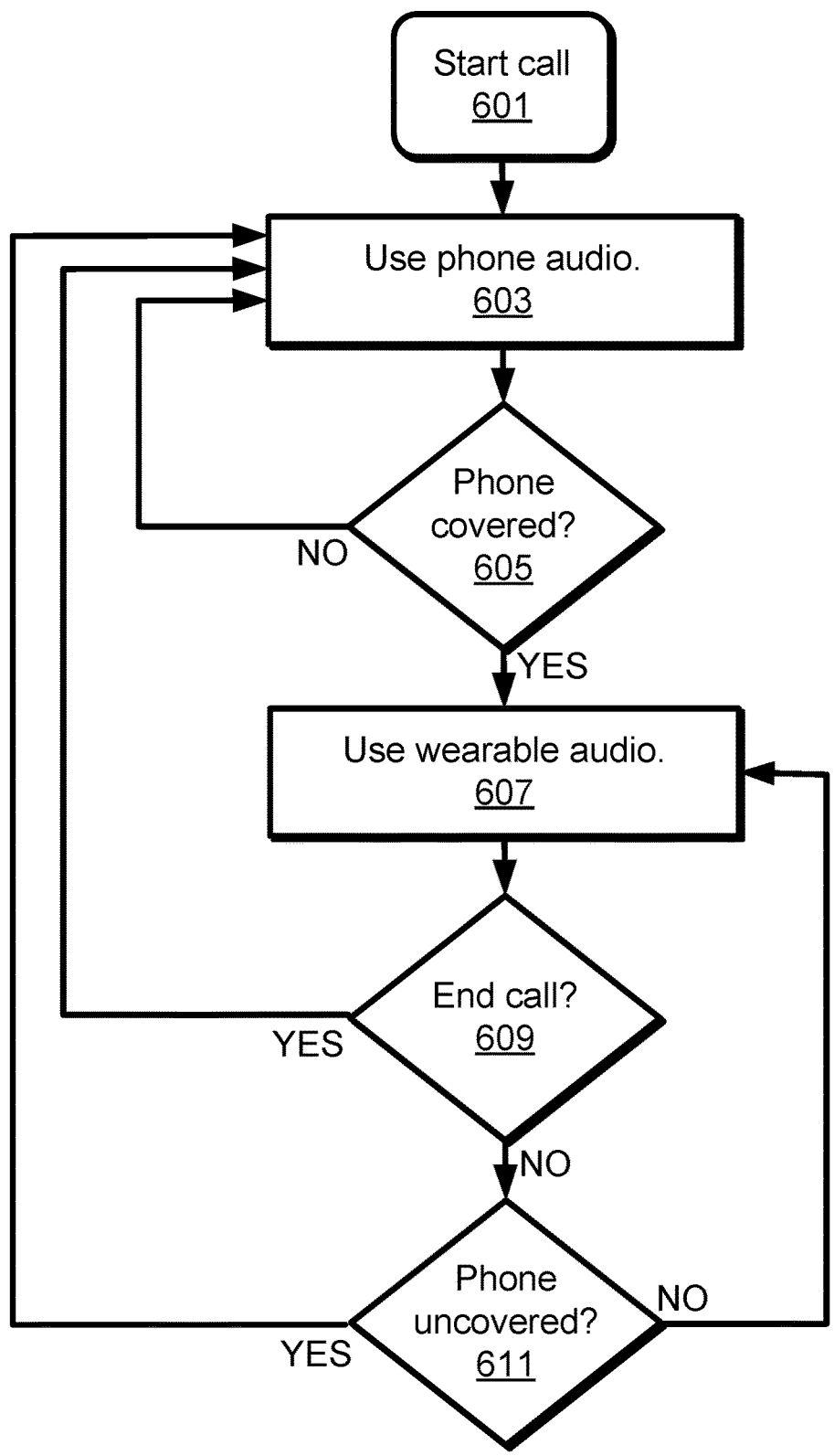
FIG. 6 is a flowchart showing a process of division of tasks between a phone and a wearable device in accordance with another embodiment of the disclosed principles.

Referring to FIG. 6, the illustrated process begins with the initiation of a phone call at stage 601. At stage 603, the phone 210 begins to use its audio facilities for the call. The phone 210 proceeds to check at stage 605 whether it is has become covered, e.g., from having been placed into a purse or pocket. If the phone 210 has not been covered, the process returns to stage 603 and the phone 210 continues to use its own audio facilities for the call.

If, however, the phone 210 has become covered, as detected at stage 605, then the process flows to stage 607, wherein the phone 210 switches the call to use the audio facilities of the wearable device 201. At stage 609, the phone 210 checks that the call is still ongoing, and if so, also checks at stage 611 whether the phone 210 has become uncovered. If it has, the process flows to stage 603, to again utilize the phone audio facilities for the call. Otherwise, the process returns to stage 607 and the phone 210 continues to use the audio facilities of the wearable device 201 for the call.

Figure 7:
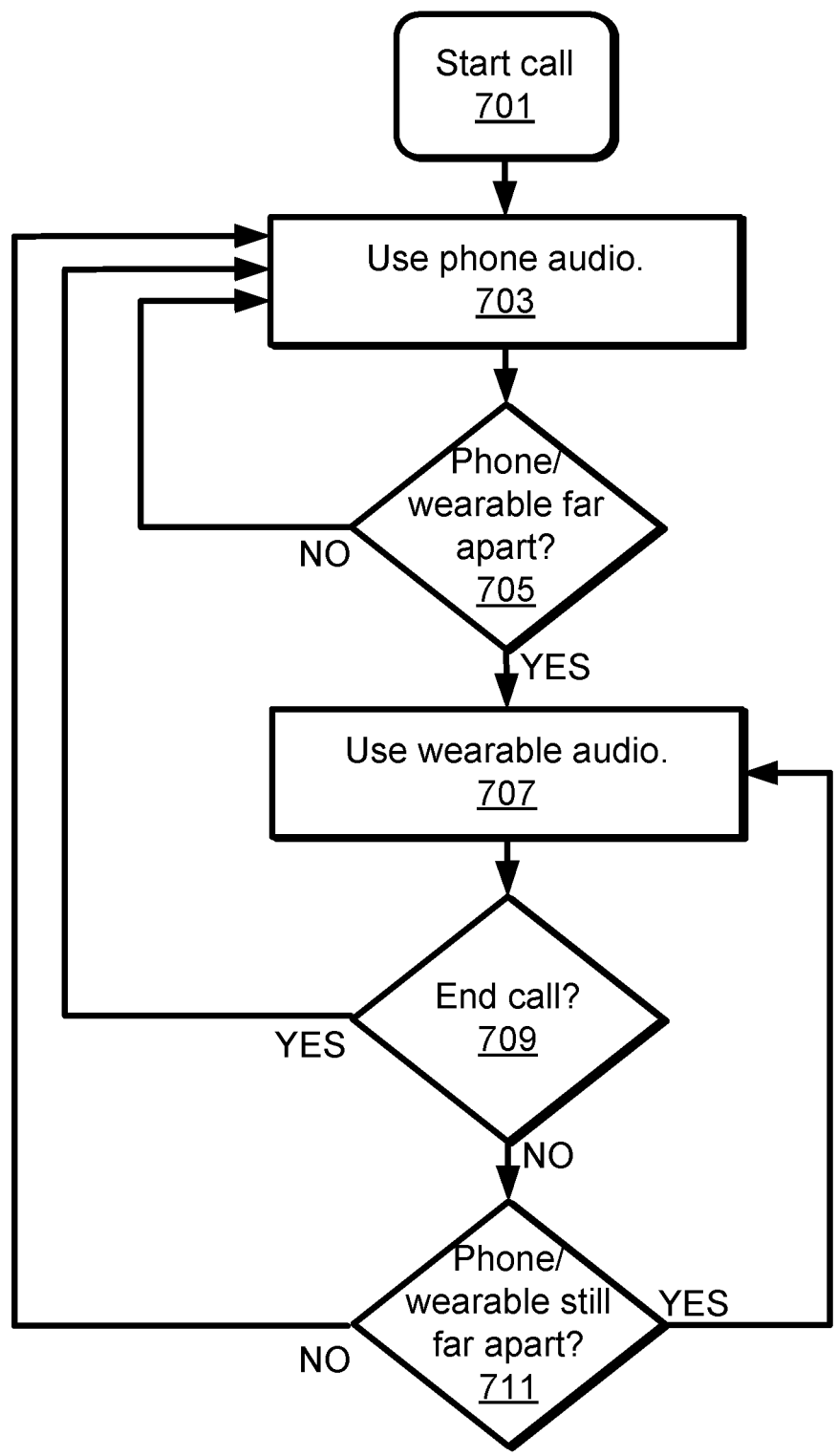
FIG. 7 is a flowchart showing a process of division of tasks between a phone and a wearable device in accordance with another embodiment of the disclosed principles.

Considering FIG. 7, this figure illustrates a process for execution when the user becomes distant from the phone 210 during an interaction with the phone 210. In an embodiment, a user may be considered "distant" from the phone 210 when the distance between the two is greater than the audible range of the mic or loudspeaker of the phone 210. It will be appreciated that any other suitable measure may be used instead if desired.

At stage 701, a phone call is initiated (made or received) via the phone 210. At stage 703, the phone 210 begins to use its audio facilities for the call, and proceeds to check at stage 705 whether the user has become distant from the phone 210. In an embodiment, this determined by assuming that the user is wearing the wearable device 201, and measuring the distance between the phone 210 and the wearable device 201. The distance between the devices 210, 201 may be measured, for example, by measuring the signal quality associated with transmissions between the two.

If the wearable device 201 and phone 210 have not become distant, then the process returns to stage 703 wherein the phone 210 continues to use its own audio facilities for the call. If, however, the wearable device 201 has become distant from the phone 210, as detected at stage 705, then the process flows to stage 707, wherein the phone 210 switches the call to use the audio facilities of the wearable device 201. At stage 709, the phone 210 checks that the call is still ongoing, and if so, also checks at stage 711 whether the wearable device 201 has become distant from the phone 210. If it has, the process flows to stage 707 and the phone 210 continues to use the audio facilities of the wearable device 201 for the call. Otherwise, the process returns to stage 703, to again use the phone audio facilities for the call.

As noted above, even if a device is covered, and its input or output devices are no longer feasible to use, RF communications may remain usable. In this case, while switching to wearable sensors, mics and speakers is appropriate, processing tasks can still utilize the blocked device. This is especially helpful if, as is often the case, the phone 210 has a more powerful processor than the wearable device 201.

Keeping certain tasks with a blocked device with respect to certain signals may be determined by determining which device can process the type of signal, what processing power is required for the processing of the signal, which device has adequate power, whether a device with a GPU (graphics processing unit) would be better at the required processing, and whether the blocked device is already busy with another task. The user may be notified via an alert on the new engaged device when a task is run on a device, such as when processing is switched over to the device or when the phone 210 switches to use the audio facilities of the wearable device 201. In a further embodiment, if both devices 210, 201 are covered at the same time, and as such no good device is detected, the phone 210 may increase its audio level and mic gain instead of switching the audio task or session to the wearable device 201.

In a further embodiment, before switching an audio or other interface to the wearable device 201 from phone 210, the phone 210 may cause the wearable device 201 to prompt the user that the phone 210 is covered, and ask the user if the user desires to switch audio to the wearable device 201. This may be especially helpful, for example, in a case where a user has purposefully covered the phone's mic momentarily to speak to someone nearby. In such a scenario, the user would likely not want audio to be switched away from the phone 210.

It will be appreciated that various systems and processes have been disclosed herein. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A mobile electronic communications device implementing adaptive video interface switching, the mobile electronic communications device comprising:
   - at least one video camera;
   - at least one video display;
   - at least one microphone (mic);
   - at least one speaker;
   - a data interface to a wearable communication device associated with a user of the mobile electronic communications device and also having a video camera and a video display, a mic and a speaker;
   - a processor linked to the at least one video camera, at least one video display, at least one mic, at least one speaker of the mobile electronic communications device, and the data interface, configured to detect during a video interface session including both audio and video that the at least one video camera or at least one video display of the mobile electronic communications device is covered and, in response to activate the data interface to use the video camera and video display of the wearable communication device.

2. The mobile electronic communications device in accordance with claim 1, wherein activating the data interface to use the video camera and video display of the wearable communication device further comprises also using the mic and speaker of the wearable communication device.

3. The mobile electronic communications device in accordance with claim 1, wherein the mobile electronic communications device further includes a headset port, and wherein activating the data interface further comprises confirming that the headset port is connected to another device having a mic and a speaker, and in response activating the data interface only for the video camera and video display of the wearable communication device.

4. The mobile electronic communications device in accordance with claim 1, wherein the mobile electronic communications device further includes a short range wireless connection mechanism, and wherein activating the data k interface further comprises confirming that the mobile electronic communications device is already interfacing to another device for audio output or input via the short range wireless connection mechanism and in response activating the data interface only for the video camera and video display of the wearable communication device.

5. The mobile electronic communications device in accordance with claim 4, wherein the short range wireless connection mechanism is Bluetooth compliant.

6. The mobile electronic communications device in accordance with claim 4, wherein activating the data interface to use the video camera and video display of the wearable communication device comprises activating the short range wireless connection mechanism to link to the wearable communication device.

7. The mobile electronic communications device in accordance with claim 1, wherein the processor is further configured to detect that the video interface session is ongoing via the wearable communication device, to receive a request to switch audio and video input and output tasks from the wearable communication device to the mobile electronic communications device, and to then continue the video interface session via the at least one video camera, at least one video display, at least one mic and at least one speaker of the mobile electronic communications device.

8. The mobile electronic communications device in accordance with claim 1, wherein the video interface session is a video call.

9. The mobile electronic communications device in accordance with claim 1, wherein the video interface session is a video playback session.

10. A method of adaptive video interface switching between a mobile electronic communications device and a wearable device, the method comprising:
    - detecting during a video interface session on the mobile electronic communications device that at least one of a mic, speaker, video camera or video display of the mobile electronic communications device is covered; and
    - activate a data link to the wearable device in response to said detecting; and
    - continuing the video interface session using one or more of a mic, speaker, video camera or video display of the of the wearable device.

11. The method in accordance with claim 10, wherein continuing the video interface session using one or more of a mic, speaker, video camera or video display of the wearable device comprises using each of the mic, speaker, video camera and video display of the wearable device to continue the video interface session.

12. The method in accordance with claim 10, wherein the mobile electronic communications device further includes a headset port, and wherein activating the data link further comprises confirming that the headset port is connected to another device having a mic and a speaker, and in response continuing the video interface session using the video camera and video display of the of the wearable device.

13. The method in accordance with claim 10, wherein the mobile electronic communications device further includes a short range wireless connection mechanism, and wherein activating the data link further comprises confirming that the mobile electronic communications device is already interfacing to another device for audio output or input via the short range wireless connection mechanism and in response activating the data link only for the video camera and video display of the wearable device.

14. The method in accordance with claim 13, wherein the short range wireless connection mechanism is Bluetooth compliant.

15. The method in accordance with claim 10, further comprising detecting that a video interface session is ongoing via the wearable device, and receiving a request to switch at least audio and video input and output tasks from the wearable device to the mobile electronic communications device.

16. The method in accordance with claim 10, wherein the video interface session is a video call.

17. The method in accordance with claim 10, wherein the video interface session is a video playback session.

18. A method of adaptive video interface switching between a mobile electronic communications device and a wearable device, the method comprising:

determining during an ongoing video session via a first device of the mobile electronic communications device or the wearable device that an audio or video input or output mechanism on the first device is compromised;

determining that audio and video input and output mechanisms on a second device of the mobile electronic communications device or the wearable device are uncompromised; and continuing the ongoing video session using at least one of the audio and video input and output mechanisms on the second device.

19. The method in accordance with claim 18, wherein determining that an audio or video input or output mechanism on the first device is compromised comprises determining that an audio or video input or output mechanism on the first device is covered and wherein determining that audio and video input and output mechanisms on the second device are uncompromised comprises determining that the audio and video input and output mechanisms on the second device are uncovered.

20. The method in accordance with claim 19, wherein the first device is the mobile electronic communications device and wherein determining that an audio or video input or output mechanism on the first device is covered further comprises determining via an internal sensor of the mobile electronic communications device that the mobile electronic communications device has been placed in a covered location.

* * * * *